United States Patent [19]

Takahashi et al.

[11] Patent Number: 4,713,408

[45] Date of Patent: Dec. 15, 1987

[54] POLYBUTYLENE TEREPHTHALATE RESIN COMPOSITION

[75] Inventors: Katsuhiko Takahashi; Yoshihisa Tajima, both of Fuji, Japan

[73] Assignee: Polyplastics Co., Ltd., Osaka, Japan

[21] Appl. No.: 811,561

[22] Filed: Dec. 20, 1985

[30] Foreign Application Priority Data

Dec. 21, 1984 [JP] Japan ............... 59-270315

[51] Int. Cl.$^4$ ............ C08K 5/42; C08K 5/04; C08K 5/09; C08L 67/02
[52] U.S. Cl. .................... 524/161; 524/166; 524/275; 524/605; 524/412
[58] Field of Search ............ 524/605, 275, 161, 513, 524/487, 166

[56] References Cited

U.S. PATENT DOCUMENTS

| | | | |
|---|---|---|---|
| 3,562,200 | 2/1971 | Jones | 524/605 |
| 3,663,498 | 5/1972 | Uebe | 524/161 |
| 3,741,936 | 6/1973 | Herwig | 524/161 |
| 3,769,260 | 10/1973 | Segal | 524/605 |
| 3,884,882 | 3/1975 | Caywood | 525/285 |
| 4,010,223 | 3/1977 | Caywood | 525/285 |
| 4,026,967 | 5/1977 | Flexman | 525/285 |
| 4,317,764 | 3/1982 | Sheer | 524/513 |
| 4,368,283 | 1/1983 | Kishida | 524/487 |
| 4,401,792 | 8/1983 | Axelrod | 524/513 |
| 4,429,067 | 1/1984 | Barenberg | 524/605 |
| 4,554,303 | 11/1985 | Petke | 524/487 |
| 4,558,085 | 12/1985 | Lee | 524/318 |

FOREIGN PATENT DOCUMENTS

| | | | |
|---|---|---|---|
| 52-47071 | 4/1977 | Japan | 524/161 |
| 56-159245 | 12/1981 | Japan | 524/161 |

*Primary Examiner*—C. Warren Ivy
*Attorney, Agent, or Firm*—Burns, Doane, Swecker & Mathis

[57] ABSTRACT

A polybutylene terephthalate resin composition comprises polybutylene terephthalate, a sulfonate anionic antistatic agent and an oxidized polyolefin wax. It is improved in the antistatic property and useful as a part for an electric instrument.

5 Claims, No Drawings

POLYBUTYLENE TEREPHTHALATE RESIN COMPOSITION

The present invention relates to a polybutylene terephthalate resin composition used in fields where adequate antistatic performance is required, including parts of precision machines and electronic and electric equipment. More particularly, the present invention related to a polybutylene terephthalate resin composition which not only gives excellent antistatic performance, but is provided with high resistance to thermal decomposition.

Among so-called engineering plastics, a polybutylene terephthalate resin is finding a wide range of industrial uses as thermoplastic resin having balanced mechanical and physical properties. Besides, because of its excellent heat resistance and moldability, it is being preferably used for parts, such as those of precision equipment, electronic and electric parts, etc.

For the purpose of foreclosing the occurrence of troubles due to electrostatic charge, etc., by preventing the deposition of dust, etc., when this resin is adapted for use as such parts, the addition of an antistatic agent is indispensable.

The antistatic agents being added to the polybutylene terephthalate resin include sulfonate anionic antistatic agents, particularly, metal salts of alkylsulfonic and alkylaromatic sulfonic acids.

However, the hitherto used polybutylene terephthalate resin containing an added sulfonate anionic antistatic agent decomposes when extruded or molded, becomes unstable in melting, invites discoloration of the resin or degradation of its physical properties such as mechanical strength, etc., produces foam when kneaded and extruded, gives lowered bulk densities and adsorbs water when its strands are cooled with water, thus requiring prolonged drying, which in turn lowers productivity.

The present inventors have repeated studies conducted in an effort to obtain polybutylene terephthalate resins having resistance to heat decomposition without impairing their excellent antistatic ability by solving the above-mentioned problems and have found that the addition of oxidized polyolefin wax together with the sulfonate anionic antistatic agent to the polybutylene terephthalate resin is highly effective.

Thus the present invention relates to a polybutylene terephthalate resin composition comprising a polybutylene terephthalate resin containing an added sulfonate anionic antistatic agent and oxidized polyolefin wax. The composition prepared in this way has improved resistance to thermal decomposition, does not suffer from degradation of mechanical properties in such workings as extrusion, molding, etc., is free from foaming and discoloration in the production processes and, therefor, it is free from troubles which are otherwise concomitant with such situations. This permits the molding to be done in a hot runner for enhanced economy. Further, since the molded article has excellent antistatic ability, the adhesion of dust due to static charge does not occur nor does degradation of mechanical properties and other various physical properties resulting from the addition of antistatic agents take place. For this reason, the present invention is extremely preferable for molding parts of precision equipment and parts of electronic and electric appliances.

The polybutylene terephthalate resin to be used in this invention may include any resin containing polybutylene terephthalate as its main component, e.g., its copolymers and mixtures, besides polybutylene terephthalate itself. An example of such mixtures is a mixed resin composition composed of polybutylene terephthalate and polyethylene terephthalate.

The sulfonate anionic antistatic agents used according to this invention include metal salts of alkylsulfonic and alkylaromatic sulfonic acids.

Examples of the metal salts of alkylsulfonic acids used according to this invention are alkali metal or alkaline earth metal salts of aliphatic sulfonic acids, with their alkyl radicals having 1 to 22 carbon atoms, preferable the number of carbon atoms of alkyl radicals being 14 to 18. The alkali metals, include sodium and potassium, and the alkaline earth metals, include calcium, barium and magnesium.

Examples of particular compounds include sodium n-hexylsulfonate, sodium n-heptylsulfonate, sodium n-octylsulfonate, sodium n-nonylsulfonate, sodium n-decylsulfonate, sodium n-dedecylsulfonate, sodium n-tetradecylsulfonate, sodium n-hexadecylsulfonate, sodium n-heptadecylsulfonate and sodium n-octadecylsulfonate.

Examples of the metal salts of alkylaromatic sulfonic acids used according to this invention are alkali metal or alkaline earth metal salts of sulfonic acids having 1 to 3 aromatic nuclei substituted with alkyl radicals having 1 to 25, preferably, 8 to 18, carbon atoms.

Examples of the alkali metal are sodium and potassium, while those of the alkaline earth metal are calcium, barium and magnesium.

The aromatic sulfonic acids, include benzenesulfonic acid, naphthalenesulfonic acid, naphthalene-2,6-disulfonic acid, diphenyl-4-sulfonic acid and diphenyl ether-4-sulfonic acid.

Particular examples of such compounds include sodium hexylbenzenesulfonate, sodium nonylbenzenesulfonate and sodium dedecylbenzenesulfonate.

These sulfonate anionic antistatic agents may be used singly or as a mixture of two or more of them. The amount of such agents added should be 0.05 to 10% by weight, preferably, 0.5 to 10% by weight, of the total composition.

The oxidized polyolefin waxes used according to this invention include those of modified polyolefines formed by thermally cracking polyolefins in an oxidizing atmosphere or by introducing such polar radicals as a carboxyl group during polymerization.

Preferable examples of the aforementioned modified polyolefins are modified polyethylene and polypropylene, while those of the modified olefin copolymers are ones obtained by modifying copolymers, etc., of ethylene as the main component, including ethylene/propylene, ethylene/vinyl acetate, ethylene/acrylic acid ester and ethylene/acrylic acid, as described above. Although the types of modified polyolefins or those of the olefin copolymers are not specifically restricted, preferred modified polyolefins are those which have low molecular weights and low moldability, modified polyethylene wax being being particularly desirable, because of their high ability of wetting the surfaces of coexisting other additives or ease of melting and kneading.

The waxes of these modified polyolefins or olefin copolymers, etc., may be used singly or as a mixture of two or more of them.

The amount of these oxidized polyolefin waxes added should be 3 to 200 parts by weight, preferably 5 to 60 parts by weight, per 100 parts by weight of the antistatic agent.

The addition of the oxidized polyolefin waxes serves to prevent the decomposition or foaming, discoloration, etc., of polybutylene terephthalate resins caused by anionic antistatic agents at high temperatures and to prevent the reduction in the mechanical properties and other physical properties due to the degradation of the resin composition during heat melting such as occurs during extrusion, molding or working.

In the composition of this invention, joint use of finely powdered silica is desirable in order to improve the dispersibility into the polybutylene terephthalate resin of the sulfonate-type anionic surface active agents and oxidized polyolefin waxes. Particularly, silicon oxide powders with particle diameters of 10 to 300 m$\mu$ are preferable.

The amount of the powder to be added should be 3 to 100 parts by weight, preferably, 5 to 50 parts by weight, per 100 parts by weight of the antistatic agent.

In the compositions of this invention, a flame retarder may be added in 1 to 30% by weight, preferably 2 to 20% by weight, of the total composition. The flame retarders herein include commonly used organic halogen compounds and phosphorus compounds, of which aromatic bromine compounds are particularly desirable. The examples include low molecular weight bromine compounds such as diphenyl ether substituted with 5 to 10 bromine atoms or ethylene glycol diphenyl ether substituted with 5 to 10 bromine atoms in its aromatic rings, brominated aromatic carbonate derived from bisphenol A, etc., brominated monomer and polymer of epoxy compounds, brominated polystyrene oligomer and brominated cyanuric acid esters.

According to this invention, these flame retarders may be used singly or as a mixture of two or more of them. In this instance, through joint use of flame retarding aids like oxides or hydroxides of metals such as antimony trioxide, antimony halide, aluminum hydroxide, or magnesium hydroxide, a more excellent flame retarding effect may be attained.

In the compounds of this invention, fibrous reinforcing fillers including inorganic fibers or whiskers, such as glass fiber, carbon fiber, graphite fiber, metal fiber, silicon carbide fiber, asbestos, wollastonite, or fibrous calcium titanate, and various organic fibers, and plate-shaped reinforcing fillers including mica (muscovite, phlogopite, sericite, etc.), plate glass (glass flake), talc, metal foil, etc. may be used as reinforcing fillers singly or as a mixture of two or more of them.

An especially preferable reinforcing filler is glass fiber, which may be added in 1 to 50% by weight, preferably 5 to 35% by weight of the total compound.

In the compounds of this invention, granular additives may be added in the ranges where they do not notably affect the moldability. Such granular additives include glass beads, calcium carbonate, quartz powder, silica, magnesium carbonate, calcium sulfate, clay, diatomaceous earth, alumina, quartz sand, glass powder, metal grains, and graphite. These granular substances may be added to provide other functions besides that of reducing the amount of the plate-shaped reinforcing fillers used.

If the reinforcing fillers and additives of various types as mentioned above are used after being subjected to surface treatment with some appropriate surface treating agents, the mechanical strength will be further improved. Various known substances are usable as such surface treating agents, according to this invention, and examples include silanes, titanates and epoxides.

In order to impart desired characteristics to the compositions of this invention according to their uses, heretofore known additives may be added singly or as a mixture of two or more of them. They include, for example, lubricants, nucleators, mold releasing agents, plasticizers, pigments, dyestuffs, thermal resistance stabilizers, ultraviolet stabilizers, organic high molecular substances, such as polycarbonate, low molecular weight polyethylene, polypropylene, polyethylene terephthalate, polyurethane, fluoro-resins, vinyl copolymers such as ethylene-vinyl acetate copolymer, ethylene-alkyl acrylate copolymer, or styrene-butadieneacrylonitrile copolyme, polyphase graft copolymers comprising polyacrylate resins, and thermoplastic segment type copolyesters (including graft copolymers).

Preparation of the composition of this invention may be readily made by conventional methods well known as methods for the preparation of resin compositions. For example, either one of a method of preparing pellets by mixing respective components, kneading them into and extruding from an extruder and, thereafter, molding, a method of preparing pellets of different compositions, mixing specified amounts of these pellets for molding and obtaining a molded article of the intended composition after molding, a method of directly feeding one or more of respective components into a molder, etc., may be used.

In the composition of this invention, as is evident from the description of specified operating examples and comparative examples, the resistance to thermal decomposition is highly improved and therefore, foaming and discoloration may be greatly mitigated.

The invention will now be described in connection with its preferred embodiments, but it is not intended to be limited by them.

Measuring methods of the physical properties shown in the following examples are as follows:

EXTRUDABILITY

A comprehensive evaluation was made based on the observation of the shape of the strand at the time of extrusion and measurements of the bulk density and water content of pellets obtained.

HALF-LIFE OF CHARGED VOLTAGE

After leaving a test piece (70×50×3 mm) at a temperature of 23° C. and humidity of 50% RH for 2 days, the half-life of charged voltage was measured with a honest-meter (impressed voltage: 6 kV, for 1 min).

HEATING LOSS

The loss on heating was measured by using a differential scanning thermobalance after leaving a test piece in air at 260° C. for 2 hours.

EXAMPLES 1 TO 15 AND COMPARATIVE EXAMPLES 1 TO 10

After mixing in a ribbon blender into polybutylene terephthalate resin (Trade name Duranex 2002, manufactured by Polyplastics Co., Ltd.), as shown in Tables 1 to 3, sodium alkylsulfonate (with the number of carbon atoms of alkyl radicals of mainly 12) and sodium alkylbenzenesulfonate (with the number of carbon atoms of alkyl radicals of mainly 12), as the sulfonate anionic antistics agents, oxidized polyethylene wax (4052E, manufactured by Mitsui Petrochemical Industries, Ltd., molecular weight of 3200), finely powdered silica (Aerosil 200, manufactured by DEGUSSA), flame retarder, antimony trioxide and glass fiber, the mixture was melted and kneaded, using a 40 mm uniaxial extruder, thereby preparing a pellet composition. Test pieces were formed from these pellets, using an extrusion molder and the half-life and the heating loss was measured using them.

1.31, a tensile strength at yield point of about 530 kg/cm² and a tensile elongation of greater than about 300%. "Aerosil 200" is a fumed silica having an average primary particle size of about 12 nm and a BET surface area of 200±25 m²/gm.

For comparison, samples in which no oxidized polyethylene wax was added were similarly prepared and evaluations were made using them. The results are shown in Table 1 to 3.

TABLE 1

| Component/Physical properties | Unit | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Polybutylene terephthalate | wt % | 97.8 | 97.6 | 97.8 | 97.6 | 98.0 | 100 | 97.8 |
| Sodium alkylsulfonate | " | 2.0 | 2.0 | — | — | 2.0 | — | 2.0 |
| Sodium alkylaromatic sulfonic | " | — | — | 2.0 | 2.0 | — | — | — |
| Oxidized polyethylene wax | " | 0.2 | 0.2 | 0.2 | 0.2 | — | — | — |
| Finely powdered silica | " | — | 0.2 | — | 0.2 | — | — | 0.2 |
| Extrudability | | good | good | good | good | foamed | good | rather good |
| Half-life of changed voltage | sec | 1 | 1 | 1 | 1 | 1 | ≧180 | 1 |
| Heating loss | wt % | 0.7 | 0.4 | 0.8 | 0.5 | 5 | 0.8 | 2.0 |
| Tensile strength | kg/cm² ASTM D-638 | 498 | 512 | 495 | 508 | 417 | 532 | 481 |

TABLE 2

| Component/Physical properties | Unit | Ex. 5 | Ex. 6 | Ex. 7 | Ex. 8 | Ex. 9 | Ex. 10 | Comp. Ex. 4 | Comp. Ex. 5 | Comp. Ex. 6 |
|---|---|---|---|---|---|---|---|---|---|---|
| Polybutylene terephthalate | wt % | 67.4 | 67.3 | 67.25 | 67.0 | 67.4 | 67.3 | 68 | 100 | 67.25 |
| Sodium alkylsulfonate | " | 0.5 | 0.5 | 0.5 | — | — | — | — | 0.5 | 0.5 |
| Sodium alkylaromatic sulfonate | " | — | — | — | 0.5 | 0.5 | 0.5 | — | — | — |
| Oxidized polyethylene wax | " | 0.1 | 0.1 | 0.25 | 0.25 | 0.1 | 0.1 | — | — | — |
| Finely powdered silica | " | — | 0.1 | — | 0.25 | — | 0.1 | — | — | 0.25 |
| Flame retarder *1 | " | 7.0 | 7.0 | 7.0 | 7.0 | 7.0 | 7.0 | 7.0 | 7.0 | 7.0 |
| Antimony trioxide | " | 5.0 | 5.0 | 5.0 | 5.0 | 5.0 | 5.0 | 5.0 | 5.0 | 5.0 |
| Glass fiber | " | 20 | 20 | 20 | 20 | 20 | 20 | 20 | 20 | 20 |
| Extrudability | | good | good | good | good | good | good | good | formed | rather good |
| Half-life of charged voltage | sec | 10 | 10 | 10 | 10 | 10 | 10 | ≧180 | 10 | 1 |
| Heating loss | wt % | 1 | 0.7 | 0.5 | 0.5 | 0.8 | 0.7 | 0.4 | 5 | 3 |
| Tensile strength | kg/cm² ASTM-D-638 | 1172 | 1181 | 1195 | 1198 | 1170 | 1178 | 1123 | 1152 | 1170 |

*1 Decabromodiphenyl ether

TABLE 3

| Component/Physical properties | Unit | Ex. 11 | Ex. 12 | Ex. 13 | Comp. Ex. 7 | Comp. Ex. 8 | Ex. 14 | Ex. 15 | Comp. Ex. 9 | Comp. Ex. 10 |
|---|---|---|---|---|---|---|---|---|---|---|
| Polybutylene terephthalate | wt % | 64 | 63.5 | 62 | 65 | 63.5 | 53 | 51 | 58 | 56 |
| Sodium alkylsufonate | " | 3 | 3 | 3 | 3 | 3 | 10 | 10 | 10 | 10 |
| Sodium alkylaromatic sulfonate | " | — | — | — | — | — | — | — | — | — |
| Oxidized polyethylene wax | " | 1 | 1.5 | 1.5 | — | — | 5 | 5 | — | — |
| Finely powdered silica | " | — | — | 1.5 | — | 1.5 | — | 2 | — | 2 |
| Flame retarder *1 | " | 7 | 7 | 7 | 7 | 7 | 7 | 7 | 7 | 7 |
| Antimony trioxide | " | 5 | 5 | 5 | 5 | 5 | 5 | 5 | 5 | 5 |
| Glass fiber | " | 20 | 20 | 20 | 20 | 20 | 20 | 20 | 20 | 20 |
| Extrudability | | good | good | good | formed | formed | good | good | inadequate | formed |
| Half-life of charge voltage | sec | ≦1 | ≦1 | ≦1 | ≦1 | ≦1 | ≦1 | ≦1 | — | ≦1 |
| Heating loss | wt % | 4 | 3 | 1 | 12 | 3 | 10 | 7 | — | 15 |
| Tensile strength | kg/cm² ASTM D-638 | 1097 | 1123 | 1192 | 965 | 1001 | 984 | 1074 | — | 795 |

*1 Decabromodiphenyl ether

The oxidized polyolefin wax represented by the trade name "4052E" is a polyolefin wax having low molecular weight and polar groups grafted thereon by an oxidation reaction or acid modification. "4052E" has a molecular weight of about 3200 and an acid value of about 20 KOH mg/g. "Duranex 2002" is a polybutylene terephthalate resin which has a specific gravity of about The embodiments of the invention in which an exclusive privilege or property is claimed are defined as follows:

1. A polybutylene terephthalate resin composition which comprises polybutylene terephthalate, a sulfonate anionic antistatic agent and an oxidized polyolefin wax formed by thermally cracking polyolefins in an oxidizing atmosphere or by introduction of polar radicals during polymerization.

2. A polybutylene terephthalate resin composition as claimed in claim 1, which comprises 0.05 to 10 percent by weight, based on the total composition, of the antistatic agent and 3 to 200 parts by weight, based on 100 parts by weight of said antistatic agent, of said polyolefin wax.

3. A polybutylene terephthalate resin composition as claimed in claim 1, which further comprises 3 to 100 parts by weight, based on 100 parts by weight of said antistatic agent, of silica powder.

4. A polybutylene terephthalate resin composition as claimed in claim 1, which further comprises at least one member of the group consisting of a flame retarder and a reinforcing filler.

5. A polybutylene terephthalate resin according to claim 1, wherein said anionic antistatic agent is a metal salt of an alkyl sulfonic acid wherein the alkyl radical has 1 to 22 carbon atoms, or a metal salt of an alkyl substituted aromatic sulfonic acid having an aromatic hydrocarbon nucleus wherein the alkyl radical has 1 to 25 carbon atoms.

* * * * *